United States Patent [19]

Barnerias et al.

[11] 4,103,459
[45] Aug. 1, 1978

[54] CHANNEL-SHAPED SEALING STRIPS

[75] Inventors: Jean Barnerias, Chartres, France; Anthony E. Johnson, Coventry, England; Erich Weimar, Viesen, Fed. Rep. of Germany

[73] Assignee: Draftex Development AG, Switzerland

[21] Appl. No.: 751,593

[22] Filed: Dec. 17, 1976

[30] Foreign Application Priority Data

Dec. 19, 1975 [GB] United Kingdom ............... 52005/75

[51] Int. Cl.² .................................................. E06B 7/16
[52] U.S. Cl. ......................................... 49/491; 49/497
[58] Field of Search ................. 49/483, 484, 485, 490, 49/491, 496, 497, 498, 499, 486, 489

[56] References Cited

U.S. PATENT DOCUMENTS

| 2,051,757 | 8/1936 | Tranis | 49/489 |
| 2,942,309 | 6/1960 | Renaudin | 49/491 |
| 3,167,825 | 2/1965 | Zaller | 49/490 |
| 3,363,364 | 1/1968 | Cadiou | 49/490 |
| 3,918,206 | 11/1975 | Dochnahl | 49/489 |

FOREIGN PATENT DOCUMENTS

| 1,378,615 | 12/1974 | United Kingdom | 49/497 |
| 1,188,633 | 4/1970 | United Kingdom | 49/491 |

Primary Examiner—Herbert F. Ross
Attorney, Agent, or Firm—Leydig, Voit, Osann, Mayer & Holt

[57] ABSTRACT

A channel-shaped sealing strip, such as for clamping over the metal flange of a vehicle door opening so as to embrace, protect and decorate the flange, comprises a flexible U-shaped metal carrier covered in elastomeric material, the elastomeric material having an insert of softer elastomeric material running along the inside of the base of the channel to seal against the edge of the flange. The strip may also have longitudinal gripping ribs running along opposite inside facing side walls of the channel to grip annd seal against the flange sides. A sealing part of softer elastomeric material may run on and along the outside of one wall of the channel. In a modification, where such a sealing part, and gripping ribs, are provided, the insert is omitted.

9 Claims, 6 Drawing Figures

CHANNEL-SHAPED SEALING STRIPS

BACKGROUND OF THE INVENTION

The invention relates to sealing strips, and more particularly to channel-shaped sealing strips such as having a longitudinal channel-shaped gripping portion for supporting the sealing strip in position on the frame of an opening which is closable such as by a window or a door and, optionally, a longitudinal sealing portion on and running along the gripping portion. An exemplary field of application of the invention is in vehicle body construction.

It is known to construct such sealing strips by covering a relatively flexible channel-shaped metal carrier with elastomeric material. A problem which has to be overcome is a tendency of moisture to travel around the flange by passing inside the channel and over the flange edge—between the latter and the base of the channel. It is known to provide the opposite facing side walls of the channel with gripping ribs running longitudinally along the channel engaging and sealing against the sides of the flanges, but these do not necessarily completely overcome the problem.

It is also known to provide a layer of mastic material in the base of the channel for sealing against the edge of the flange. However, this has disadvantages because a special operation is necessary to place the mastic in position and it may deteriorate (lose its sealing properties) during storage or in use.

It is therefore an object of the invention to provide an improved channel-shaped sealing strip.

A more specific object of the invention is to provide an improved channel-shaped sealing strip which provides a more satisfactory seal between the edge of the flange in use and the base of the channel.

In a known form of channel-shaped sealing strip such as referred to above—that is, a channel-shaped sealing strip having internal gripping ribs extending longitudinally along opposite inside facing walls of the channel, it is also known to provide a sealing part running along the outside of one wall of the channel, this sealing part being positioned so as to seal against a door, for example, which closes the opening. A problem which can arise here is that the different parts of such a sealing strip have to perform different purposes, and it has been found that, in order to do this, they should not necessarily all be of the same consistency and/or hardness.

It is therefore a further object of the invention to provide a channel-shaped sealing strip in which the different parts are better adapted to suit their respective purposes but at the same time ensuring simplicity and economy in manufacture.

SUMMARY OF THE INVENTION

According to the invention, there is provided a channel-shaped sealing strip, comprising U-shaped metal carrier means enclosed in a channel-shaped elastomeric material, the elastomeric material including an insert of softer elastomeric material which runs along the inside surface of the base of the channel.

According to the invention, there is also provided a channel-shaped sealing strip, comprising U-shamed metal carrier means ensed in eetruded elasaomeric material ou slid nsiaency ao uorm a channel with integraly extruded griping ribs on osite inside facing walls of the channel, the gripping ribs being made of elastomeric material of softer consistency than the material of the channel, and a sealing part of cellular elastomeric material on and running along the outside of the elastomeric material of the channel and extruded integrally therewith.

BRIEF DESCRIPTION OF THE DRAWINGS

Channel-shaped sealing strips embodying the invention will now be described, by way of example only, with reference to the accompanying drawings in which.

DESCRIPTION OF PREFERRED EMBODIMENTS

The sealing strips to be described are for attachment around the frame of the door opening in a vehicle body. They are designed to clamp over the metal flange of the door opening so as to embrace, protect and decorate the flange. As will be apparent, they may carry a seal against which the door closes in use. The door opening may, for example, be a passenger door opening of the vehicle or a door opening of the luggage compartment for example.

Figure 1:
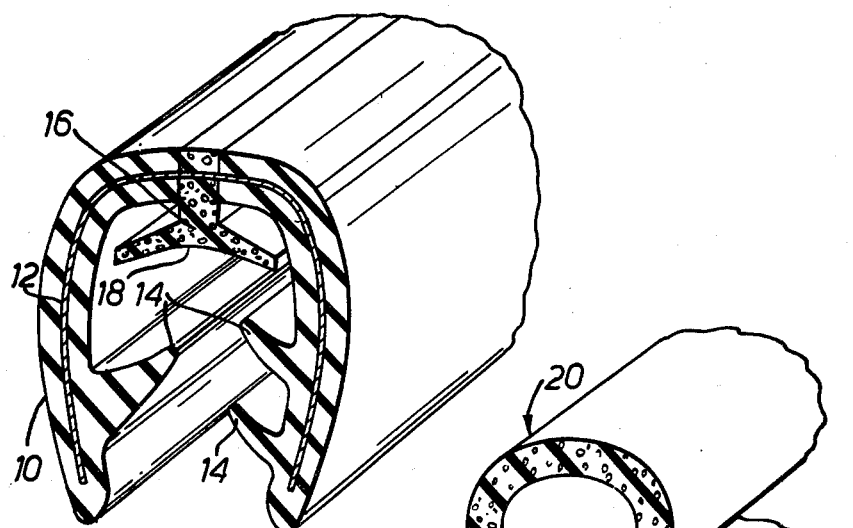
FIG. 1 is a perspective view of one of the sealing strips, with its end shown in section.

As shown in FIG. 1, the sealing strip comprises an extrusion of natural or synthetic rubber (or similar) material 10 of generally channel-shaped form completely enclosing a metal carrier 12 also of channel-shaped form. The metal carrier 12 may comprise a series of U-shaped elements arranged side-by-side along the length of the strip and either connected by short flexible links or entirely disconnected. Carriers made of wire may instead be used. Other forms of carrier are also possible. Whatever the form of carrier used, however, it is designed so that the sealing strip has reasonable flexibility. As shown in FIG. 1, the inside facing walls of the material 10 are provided with longitudinally running gripping ribs 14.

The extruded material 10 is extruded integrally with an insert 16. The insert 16 is arranged to be of cellular or similar material while the remainder of the material 10 is of solid consistency. Techniques are known for such integral moulding of materials of different consistency.

In a modification, the manufacturing process is arranged to give the ribs 14 a cellular consistency like the insert 16. In another modification, the ribs 14 are not of cellular consistency but they differ from the remainder of the material 10 in being softer than the latter.

It will be observed that the insert 16, on the inside of the channel, extends proud of the inside base of the channel and is shaped to provide a trough 18 extending longitudinally of the strip.

In use, the sealing strip illustrated is pressed onto the flange around the door opening so that the free edge of the flange engages and enters the trough 18, and so that the gripping ribs 14 tightly engage the sides of the flange. The sealing strip thus embraces, protects and decorates the flange, and the appearance may be enhanced by providing a suitable pattern on at least part of the external surface of the material 10.

The gripping ribs 14 help to resist inadvertent removal of the sealing strip. If they are of softer material than the material 10 at the sides of the channel, as suggested above, this may be advantageous in providing an improved grip and an improved seal between the sealing strip and the flange.

The cellular insert 16 is advantageous in that it provides a good seal for the free edge of the flange. In combination with the action of the gripping ribs 14, therefore, this helps to resist the possibility of draughts and moisture entering the door opening (even when closed by a door) by travelling around the inside of the channel of the sealing strip.

The trough 18 is advantageous in that it enhances the sealing effect of the insert 16 and, by providing room for receiving the free edge of the flange, reduces the possibility (which might be more likely to exist if the trough 18 were omitted) of the sealing strip bouncing off the flange if pressed onto the flange too vigorously.

Figure 2:
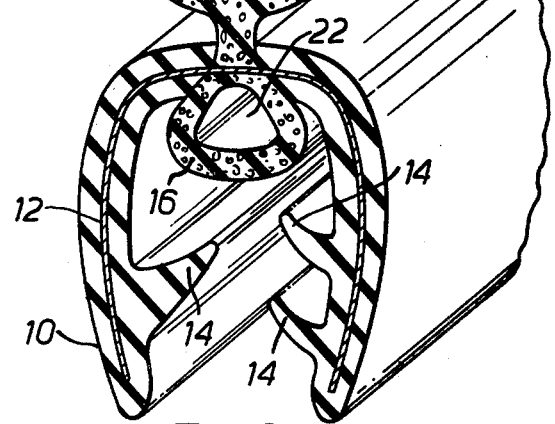
FIG. 2 is a perspective view of another of the sealing strips with its end shown in section.

In FIG. 2, parts corresponding to FIG. 1 are similarly referenced. The sealing strip of FIG. 2 differs in that the cellular insert 16 is arranged to be extruded integrally with a tubular seal 20 of, for example, the same consistency. The sealing strip of FIG. 2 is thus suitable for use on a flange surrounding the luggage compartment of a vehicle. The channel-shaped part of the sealing strip thus supports the sealing part, 20, in such an attitude that the door of the opening closes on to the sealing part 20 to provide an air and weathertight seal.

The structure of FIG. 2 also differs from that of FIG. 1 in that, instead of the trough 18 in the insert 16, the inwardly extending part of the insert 16 is arranged to be tubular as shown at 22. The purpose of this is to give extra flexibility where the insert 16 contacts the free edge of the flange so as to reduce the possibility of bouncing as explained above. However, it will be appreciated that the tubular structure 22 could be replaced by the provision of a trough 18; similarly, the trough 18 of the structure of FIG. 1 could be replaced by a tubular structure 22.

Figure 3:
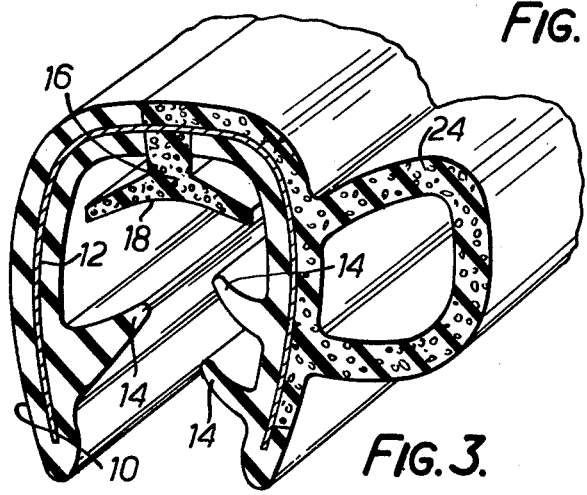
FIG. 3 is a perspective view of a further one of the sealing strips with its end shown in section.

In FIG. 3 parts corresponding to parts in the other Figures are similarly referenced.

In FIG. 3, the sealing strip is provided with a tubular sealing section 24 which is integral with the insert 16 but mounted on the outside wall of the channel and is of cellular consistency like the insert 16. In addition, it will be observed that the outside wall of the channel on which is mounted the sealing part 24 is also of cellular consistency.

The structure of FIG. 3 is particularly suitable for mounting on the flange surrounding a passenger door opening of a vehicle and supports the sealing part 24 to be engaged by the door to provide an air and weathertight seal.

Figure 4:
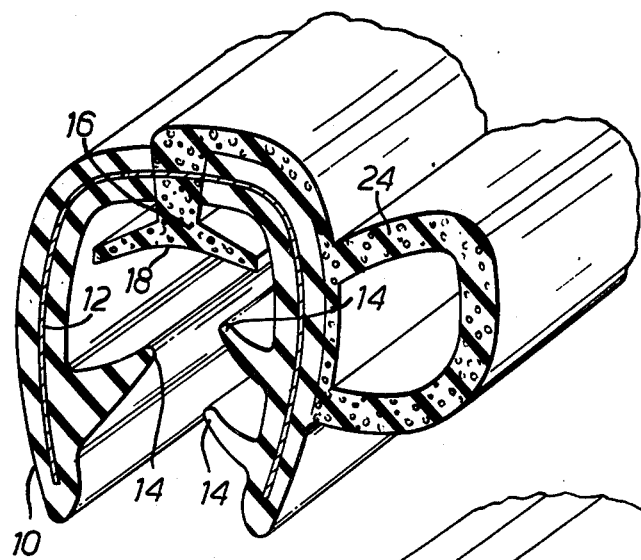
FIG. 4 is a perspective view of a modified form of the sealing strip of FIG. 3 with its end shown in section.

FIG. 4 illustrates a modified form of the structure of FIG. 3 in which both sides of the channel are extruded in material of solid consistency.

Figure 5:
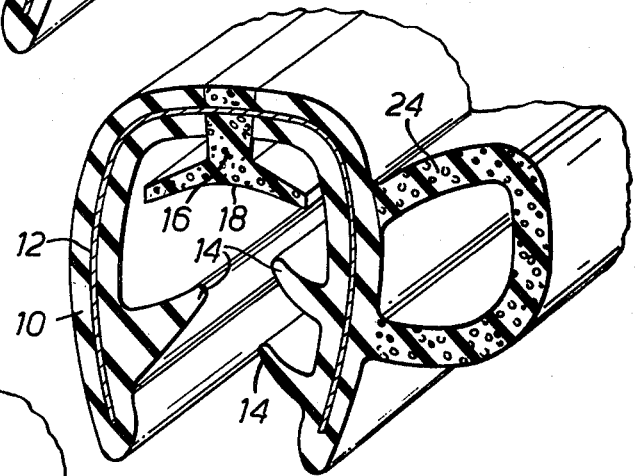
FIG. 5 is a perspective view of another modified form of the sealing strip of FIG. 3 with its end shown in section.

In the further modified form of FIG. 5, the sealing part 24, although once again extruded integrally with the insert 16 (and with the material 10) and of the same cellular consistency as the insert 16, is not in fact contiguous with the insert 16.

It will be appreciated that other structures are possible with the sealing parts (e.g. 20 or 24) having other configurations such as being of leaf-shape instead of tubular and being differently positioned relative to the insert 16.

In each case, the gripping ribs 14 may, as described with reference to FIG. 1, be made of solid rubber like the material 10 but advantageously softer than the material 10, or they may be made of cellular rubber like the insert 16.

Similarly, the insert 16 may have the trough 18 or the tubular form 22 or it may have some other suitable configuration. Specifically, it may have a configuration corresponding to that shown in FIG. 2 but without the bore running therealong to provide the tube 22—although, as explained above, such a structure may under certain circumstances provoke bouncing.

Figure 6:
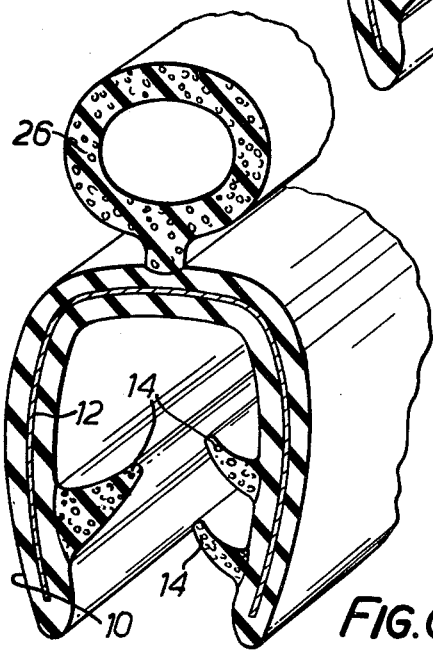
FIG. 6 is a perspective view of yet another one of the sealing strips with its end shown in section.

In the sealing strip shown in FIG. 6, the insert 16 is omitted but the material 10 is extruded integrally with gripping ribs 14 and a tubular sealing part 26 similar to the sealing part 20 of FIG. 2. The extrusion process is such that the channel-shaped material 10 is of solid rubber while the tubular sealing part 26 is of cellular rubber. The gripping ribs 14 may be of solid rubber but softer than the material 10 or they may be of cellular rubber like the sealing part 26.

Although the structures shown have one gripping rib 14 on one side of the channel and two on the other side, it will be appreciated that there may be more gripping ribs on one or both sides of the channel or just one rib on each channel side, and there can be equal or unequal numbers of ribs on each side. Furthermore, the gripping rib or ribs on one side of the channel may differ from that or those on the other side. On one side of the channel, the rib or ribs may be solid, and possibly of softer consistency than the material 10, while on the other side of the channel the rib or ribs may be cellular or may be non-cellular and of the same hardness as the material 10.

What is claimed is:

1. A channel-shaped sealing strip, comprising
U-shaped metal carrier means,
channel-shaped elastomeric material enclosing the carrier means,
a linear insert of softer elastomeric material in and extending through the thickness of the channel-shaped elastomeric material and running along the base of the channel and being proud of the inside surface of the base, the said insert being of cellular elastomeric material and being formed integrally with the remainder of the elastomeric material, and
a sealing part attached to and running along the outside of the channel, the sealing part being made of cellular elastomeric material formed integrally with and being an extension of the cellular elastomeric material of the linear insert.

2. A strip according to claim 1, in which the said insert, where it is proud of the inside surface of the base of the channel, is trough-shaped to present a concave surface facing towards the mouth of the channel.

3. A strip according to claim 1, in which the insert, where it is proud of the inside surface of the base of channel, is tubular, with the axis of the tube running along the length of the channel.

4. A strip according to claim 1, including a sealing part running along the outside of the base of the channel.

5. A strip according to claim 1, including one or more gripping ribs on the inside facing walls of the channel.

6. A strip according to claim 5, in which the ribs on opposite sides of the channel are of different hardness.

7. A strip according to claim 5, in which at least one of the ribs is of the same consistency and hardness as the elastomeric material of the channel sides.

8. A strip according to claim 5, in which at least one of the ribs is of the same consistency as but softer than the elastomeric material of the channel sides.

9. A strip according to claim 5, in which at least one of the ribs is of cellular form.

* * * * *